United States Patent [19]

Mercado

[11] Patent Number: 5,000,548
[45] Date of Patent: Mar. 19, 1991

[54] MICROSCOPE OBJECTIVE

[75] Inventor: Romeo I. Mercado, San Jose, Calif.

[73] Assignee: Lockheed Missiles & Space Company, Inc., Sunnyvale, Calif.

[21] Appl. No.: 185,597

[22] Filed: Apr. 25, 1988

[51] Int. Cl.$^5$ .............................................. G02B 21/02
[52] U.S. Cl. ..................................................... 354/414
[58] Field of Search ........................ 350/414, 442, 469

Primary Examiner—Paul M. Dzierzynski
Attorney, Agent, or Firm—John J. Morrissey

[57] ABSTRACT

A finite conjugate imaging system useful as a microscope objective comprises four lens elements (10), (11), (12), and (13) disposed coaxially along an optic axis. Lens elements (10) and (12) are made of Hoya LAC7 glass, and lens elements (11) and (13) are made of calcium fluoride crystal. The radii of curvature of the lens elements and the separations between adjacent lens elements are prescribed so as to obtain color correction of the system at five discrete wavelengths.

6 Claims, 4 Drawing Sheets

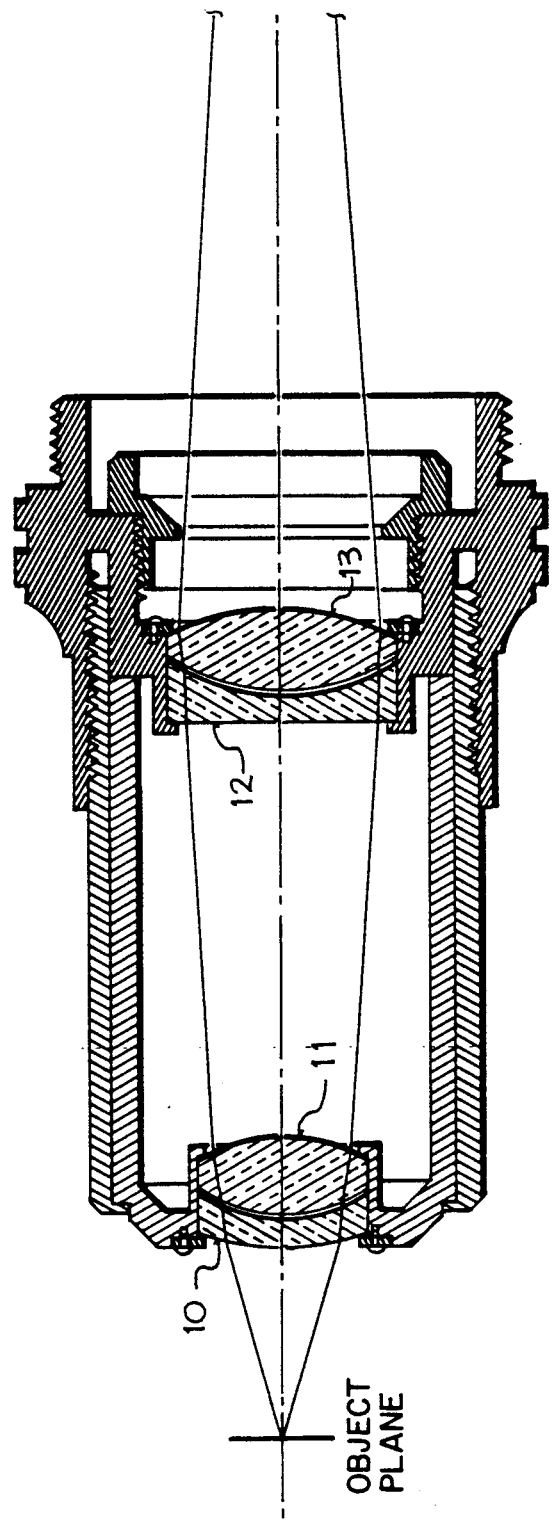
FIG_1
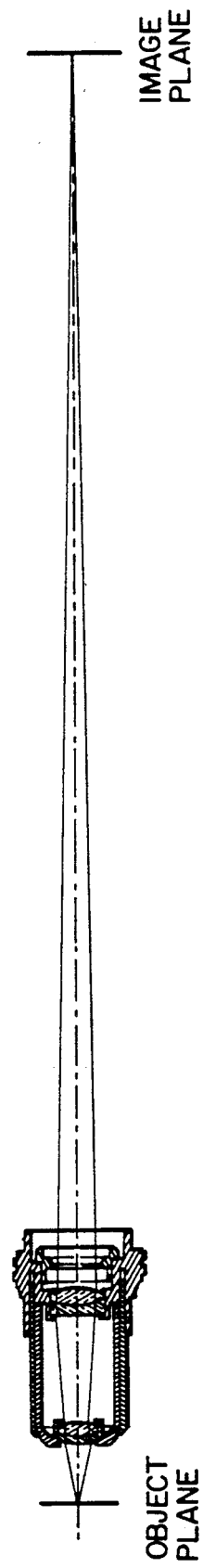
FIG_2

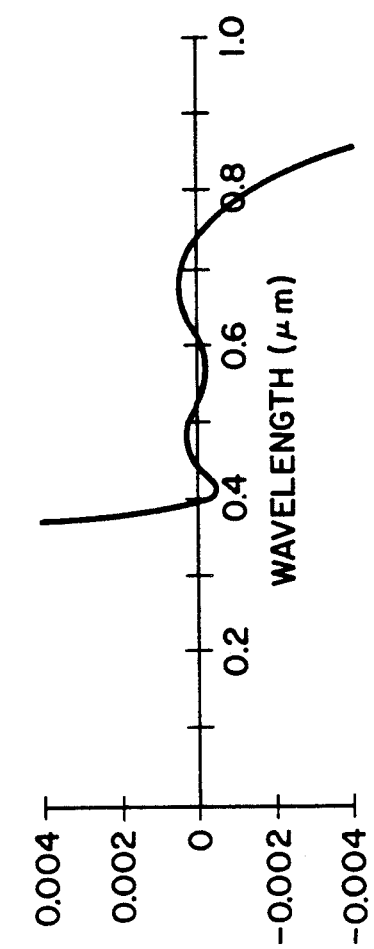
FIG_3
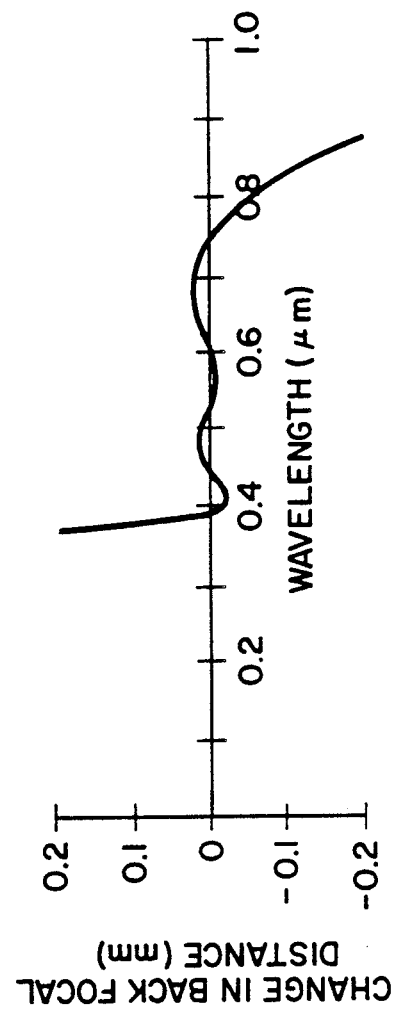
FIG_4

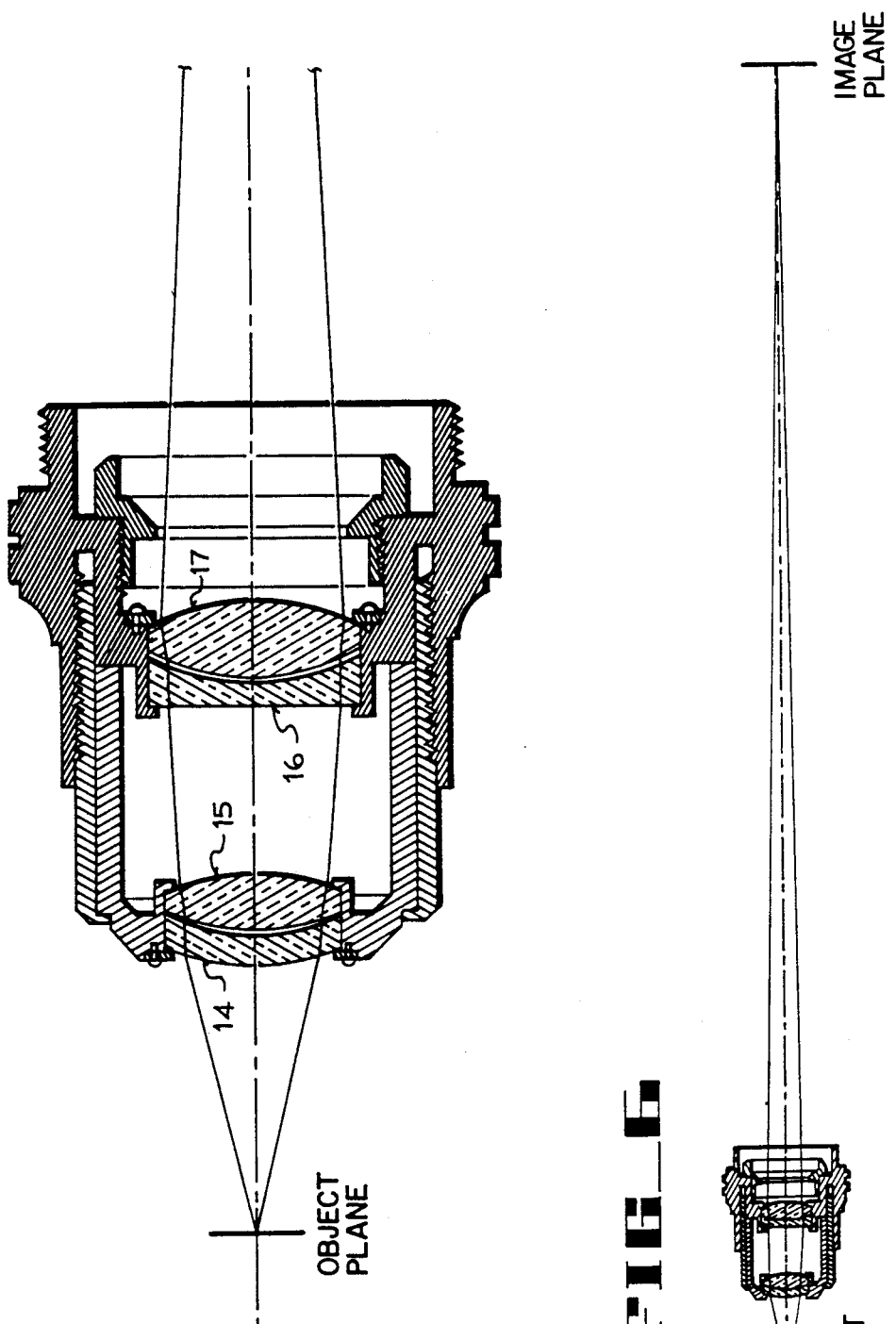

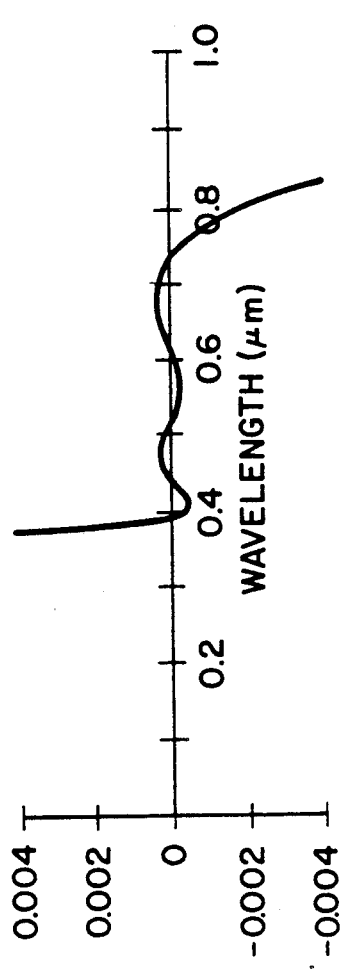
FIG_7
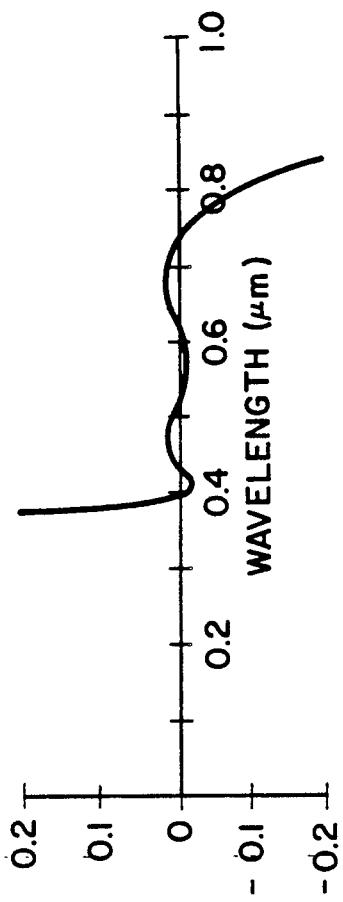
FIG_8

MICROSCOPE OBJECTIVE

TECHNICAL FIELD

This invention relates generally to finite conjugate imaging systems, and more particularly to color-corrected finite conjugate imaging systems for use as microscope objectives.

The present patent application is a continuation-in-part of U.S. patent application Ser. No. 676,295 filed on Nov. 29, 1984.

BACKGROUND OF THE INVENTION

A finite conjugate imaging system was disclosed in U.S. patent application Ser. No. 676,295 as a subsystem of a catadioptric imaging system that is color-corrected at five wavelengths (i.e., which brings paraxial marginal rays to a common focus at five discrete wavelengths). Accordingly, the design form of the finite conjugate imaging system, functioning as a subsystem, was optimized in that particular application to correct for chromatic aberrations, monochromatic aberrations, and chromatic variations of the monochromatic aberrations of the overall catadioptric imaging system of which the finite conjugate imaging system was a part.

The finite conjugate imaging system that was described as a subsystem in U.S. patent application Ser. No. 676,295 could also function independently as a relay lens. However, to function as a useful microscope objective, the finite conjugate imaging system would have to be re-designed and optimized to correct for chromatic aberrations, monochromatic aberrations and chromatic variations of the monochromatic aberrations in order to operate at higher magnification with a higher numerical aperture.

It is an object of the present invention to re-optimize the design form of the finite conjugate imaging system described in U.S. patent application Ser. No. 676,295 for use independently as a microscope objective. In particular, the design form of that finite conjugate imaging system has been re-optimized according to the present invention in order to provide 10X magnification with a numerical aperture of 0.25, while retaining color correction at five discrete wavelengths with minimal residual aberrations.

DESCRIPTION OF THE DRAWING

FIG. 1 is a schematic profile drawing of a finite conjugate imaging system using the optical materials disclosed in U.S. patent application Ser. No. 676,295, but which has been re-designed for use as a 10X microscope objective with a numerical aperture of 0.25 while retaining color correction at five discrete wavelengths.

FIG. 2 is a schematic drawing of the finite conjugate imaging system of FIG. 1 in which the two finite conjugate planes of the system are illustrated.

FIG. 3 is a plot of paraxial marginal ray height at the image plane versus wavelength for the finite conjugate imaging system of FIG. 1.

FIG. 4 is a plot of change in back focal distance versus wavelength for the finite conjugate imaging system of FIG. 1.

FIG. 5 is a schematic profile drawing of another finite conjugate imaging system, which uses the same optical materials as the finite conjugate imaging system of FIG. 1, and which also operates at 10X magnification with a numerical aperture of 0.25 while retaining color correction at five discrete wavelengths.

FIG. 6 is a schematic drawing of the finite conjugate imaging system of FIG. 5 in which the two finite conjugate planes of the system are illustrated.

FIG. 7 is a plot of paraxial marginal ray height at the image plane versus wavelength for the finite conjugate imaging system of FIG. 5.

FIG. 8 is a plot of change in back focal distance versus wavelength for the finite conjugate imaging system of FIG. 5.

BEST MODE FOR CARRYING OUT THE INVENTION

As illustrated in FIG. 1, a finite conjugate imaging system according to the present invention comprises four lens elements 10, 11, 12 and 13, which are disposed coaxially with respect to each other in a typical mounting device for a microscope objective. The optical prescription for the finite conjugate imaging system of FIG. 1 is specified in tabular format as follows:

TABLE I

| Surface No. | Radius (mm) | Thickness (mm) | $N_d$ | $V_d$ | Material |
|---|---|---|---|---|---|
| 0 | | 8.489 | [Object Plane] | | |
| 1 | 14.783 | 1.287 | 1.65160 | 58.38 | LAC7 |
| 2 | 5.761 | 0.050 | | | Air |
| 3 | 5.842 | 3.122 | 1.43388 | 95.57 | $CaF_2$ |
| 4 | −6.772 | 17.329 | | | Air |
| 5 | 701.163 | 1.306 | 1.65160 | 58.38 | LAC7 |
| 6 | 10.413 | 0.050 | | | Air |
| 7 | 9.934 | 3.225 | 1.43388 | 95.57 | $CaF_2$ |
| 8 | −11.648 | 170.000 | | | Air |
| 9 | | | [Image Plane] | | | where, in accordance with optical design convention, the surfaces of the lens elements are numbered consecutively from left to right along the optic axis of the system as shown in FIG. 1.

The radii of curvature and the thicknesses of the lens elements are expressed in millimeters in the optical prescription of Table I. The radius of curvature for a particular surface is listed with either a positive or a negative sign in Table I according to whether the particular surface is convex or concave. The focal length of the system shown in FIG. 1 is 17.8 mm at the yellow d line of helium (i.e., 0.5876 micron), which is a convenient and conventional focal length for microscope objectives of the Lister type.

Surfaces No. 1 and No. 2 are the surfaces of the lens element 10, which is made of Hoya LAC7 glass. Surfaces No. 3 and No. 4 are the surfaces of the lens element 11, which is made of calcium fluoride ($CaF_2$) crystal. The thickness listed for surface No. 1 is the thickness of the lens element 10 along the optic axis of the system. The thickness listed for surface No. 2 is the separation between surface No. 2 of the lens element 10 and surface No. 3 of the lens element 11 along the optic axis of the system. In the same way, the thicknesses of the other lens elements and the separations between other adjacent lens elements are listed.

FIG. 2 shows the two conjugate planes (i.e., the object plane and the image plane) for the finite conjugate imaging system illustrated in FIG. 1. It is a feature of the finite conjugate imaging system illustrated in FIGS. 1 and 2 that 10X magnification and a numerical aperture of 0.25 have been achieved, along with color correction at five discrete wavelengths.

FIG. 3 is a plot of paraxial marginal ray height at the image plane versus wavelength over a wavelength band that includes the visible and near infrared regions of the electromagnetic spectrum for the finite conjugate imaging system shown in FIG. 1. The value of the paraxial marginal ray height at a given image surface for an optical imaging system at any given wavelength is a measure of the geometrical blur (i.e., the axial image blur without consideration of diffraction effects) inherent in the system at that particular wavelength. The variation of paraxial marginal ray height with respect to wavelength at a given image surface provides an indication of the extent to which axial chromatic aberration is corrected in the system. The wavelength scan curve of FIG. 3 indicates that the finite conjugate imaging system of FIG. 1 is color-corrected at five wavelengths in the visible and near infrared regions of the spectrum corresponding to the five crossings of the horizontal (i.e., wavelength) axis. From the fact that the wavelength scan curve of FIG. 3 remains very close to the horizontal axis throughout the visible and near infrared regions of the spectrum, it is also apparent that secondary and higher-order spectra are practically insignificant throughout that broad wavelength band.

FIG. 4 is a plot of change in back focal distance versus wavelength for the finite conjugate imaging system of FIG. 1 over the same wavelength band as shown in FIG. 3. The back focal distance of an optical imaging system for a particular wavelength is the distance along the optic axis of the system between the image plane for that particular wavelength and the refractive surface of the system closest to that image plane. For a color-corrected imaging system, paraxial marginal rays at the wavelengths for which color correction has been achieved are brought to a common focus at a common image point. The back focal distance for those wavelengths for which color correction has been achieved is considered as a "baseline" back focal distance. The change in back focal distance from the "baseline" back focal distance as a function of wavelength provides an indication of the chromatic variation in focal position along the optic axis, and hence is commonly called axial (or longitudinal) chromatic aberration. The wavelength scan curve of FIG. 4 indicates that the finite conjugate imaging system illustrated in FIG. 1 has little appreciable axial chromatic aberration over the visible and near infrared regions of the spectrum, and has zero axial chromatic aberration at five discrete wavelengths. The finite conjugate imaging system of FIG. 1 is also well-corrected for monochromatic aberrations, and for chromatic variations of the monochromatic aberrations. This system is well-suited for use as a standard microscope objective, and can also be used in high-precision laboratory and instrument applications in which up to five different wavelengths (e.g., different laser lines) are required to be focussed simultaneously at a common point.

Another finite conjugate imaging system, which is made of the same two optical materials as the system illustrated in FIG. 1, and which is likewise optimized for use at 10X magnification with a numerical aperture of 0.25, and which is color-corrected at five discrete wavelengths, is illustrated in FIG. 5. The finite conjugate imaging system of FIG. 5 comprises four lens elements 14, 15, 16 and 17 disposed coaxially with respect to each other along an optic axis. The optical prescription for the finite conjugate imaging system of FIG. 5 is specified in tabular format as follows:

TABLE II

| Surface No. | Radius (mm) | Thickness (mm) | $N_d$ | $V_d$ | Material |
|---|---|---|---|---|---|
| 0 | | 12.893 | [Object Plane] | | |
| 1 | 15.387 | 1.106 | 1.65160 | 58.38 | LAC7 |
| 2 | 7.278 | 0.131 | | | Air |
| 3 | 7.596 | 2.902 | 1.43388 | 95.57 | $CaF_2$ |
| 4 | −8.722 | 6.693 | | | Air |
| 5 | 407.060 | 1.091 | 1.65160 | 58.38 | LAC7 |
| 6 | 9.338 | 0.100 | | | Air |
| 7 | 8.876 | 3.025 | 1.43388 | 95.57 | $CaF_2$ |
| 8 | −14.249 | 170.000 | | | Air |
| 9 | | | [Image Plane] | | | where the surfaces of the lens elements are numbered consecutively from left to right along the optic axis, and where the "radius", "thickness", "$N_d$", "$V_d$" and "material" are listed as discussed above in connection with Table I. The focal length of the system shown in FIG. 5 is 16.3 mm at the yellow d line of helium. The finite conjugate imaging system of FIG. 5 is likewise well-corrected for monochromatic aberrations, and for chromatic variations of the monochromatic aberrations.

FIG. 6 shows the two conjugate planes (i.e., the object plane and the image plane) for the finite conjugate imaging system illustrated in FIG. 5.

FIG. 7 is a plot of paraxial marginal ray height at the image plane versus wavelength for the finite conjugate imaging system of FIG. 5 over a wavelength band that includes the visible and near infrared regions of the electromagnetic spectrum. The five crossings of the wavelength axis by the wavelength scan curve of FIG. 7 indicate the five wavelengths for which the finite conjugate imaging system of FIG. 5 is color-corrected (i.e., for which axial chromatic aberration is zero). The closeness of the wavelength scan curve of FIG. 7 to the wavelength axis indicates that the system has only insignificant secondary and higher-order spectra throughout the visible and near infrared regions of the spectrum. FIG. 8 is a plot of change in back focal distance versus wavelength, which confirms that chromatic variation in focal position along the optic axis is insignificant for the finite conjugate imaging system of FIG. 5 over the visible and near infrared regions of the spectrum.

The present invention has been described above in terms of particular embodiments and particular applications. However, other embodiments and applications within the scope of the present invention would become apparent to practitioners skilled in the art upon perusal of the foregoing specification and accompanying drawing. It should be noted that although the embodiments of the invention illustrated in FIGS. 1 and 5 are optimized for specific conjugate distances, microscope objectives according to those embodiments are not restricted to use at those specified conjugate distances. Accordingly, the invention is defined more generally by the following claims and their equivalents.

I claim:

1. A finite conjugate imaging system comprising a plurality of lens elements made of only two different kinds of optical materials, said lens elements coacting with each other to bring paraxial marginal rays passing through said system to a common focus at five discrete wavelengths.

2. The finite conjugate imaging system of claim 1 wherein said optical materials comprise calcium fluoride crystal and a glass having a refractive index of approximately 1.65 and an Abbe number of approximately 58.38 at a wavelength of approximately 0.5876 micron.

3. The finite conjugate imaging system of claim 2 wherein said glass is Hoya LAC7 glass.

4. The finite conjugate imaging system of claim 3 comprising a first lens element made of Hoya LAC7 glass, a second lens element made of calcium fluoride crystal, a third lens element made of Hoya LAC7 glass, and a fourth lens element made of calcium fluoride crystal, said first, second, third and fourth lens elements being disposed consecutively along an optic axis of the system.

5. The finite conjugate imaging system of claim 4 wherein said lens elements are configured and positioned with respect to each other approximately as follows:

| Surface No. | Radius (mm) | Thickness (mm) | $N_d$ | $V_d$ | Material |
|---|---|---|---|---|---|
| 0 | | 8.489 | | | [Object Plane] |
| 1 | 14.783 | 1.287 | 1.65160 | 58.38 | LAC7 |
| 2 | 5.761 | 0.050 | | | Air |
| 3 | 5.842 | 3.122 | 1.43388 | 95.57 | $CaF_2$ |
| 4 | −6.772 | 17.329 | | | Air |
| 5 | 701.163 | 1.306 | 1.65160 | 58.38 | LAC7 |
| 6 | 10.413 | 0.050 | | | Air |
| 7 | 9.934 | 3.225 | 1.43388 | 95.57 | $CaF_2$ |
| 8 | −11.648 | 170.000 | | | Air |
| 9 | | | | | [Image Plane] |

6. The finite conjugate imaging system of claim 4 wherein said lens elements are configured and positioned with respect to each other approximately as follows:

| Surface No. | Radius (mm) | Thickness (mm) | $N_d$ | $V_d$ | Material |
|---|---|---|---|---|---|
| 0 | | 12.893 | | | [Object Plane] |
| 1 | 15.387 | 1.106 | 1.65160 | 58.38 | LAC7 |
| 2 | 7.278 | 0.131 | | | Air |
| 3 | 7.596 | 2.902 | 1.43388 | 95.57 | $CaF_2$ |
| 4 | −8.722 | 6.693 | | | Air |
| 5 | 407.060 | 1.091 | 1.65160 | 58.38 | LAC7 |
| 6 | 9.338 | 0.100 | | | Air |
| 7 | 8.876 | 3.025 | 1.43388 | 95.57 | $CaF_2$ |
| 8 | −14.249 | 170.000 | | | Air |
| 9 | | | | | [Image Plane] |

* * * * *